3,830,737
COMPOSITIONS AND METHODS FOR STIMULATING WELLS BY PREFERENTIALLY DISSOLVING REFRACTORY ORGANIC MATERIALS
Robert H. Friedman and Julianne D. Krause, Houston, Tex., assignors to Getty Oil Company, Los Angeles, Calif.
No Drawing. Filed July 7, 1972, Ser. No. 269,866
Int. Cl. E21b 43/00
U.S. Cl. 252—8.55 B                    12 Claims

ABSTRACT OF THE DISCLOSURE

Compositions are provided for use in subterranean formations from which oil or gas may be produced, which will preferentially dissolve the heavy refractory organic materials present in the formation. The composition includes a thickening agent such as hydroxyethylcellulose dissolved in fresh water, a carrying agent such as alcohol, a solvent for the refractory materials, such as xylene, and optionally a tying agent such as dimethylsulfoxide.

Methods for stimulation of wells are provided, utilizing such compositions.

BACKGROUND OF THE INVENTION

This invention relates to wells, and particularly to the recovery of petroleum oil and gas from such wells. More specifically, the invention is directed to the stimulation of wells by increasing the permeability within the well bore.

Oil and gas generally exists in subterranean formations which are not homogenous and which contain significant amounts of water or brine. The porosity and permeability of the strata and sands of the formation, both in and adjacent the well borehole, vary considerably. Often, the more porous formations have high water and low oil content.

One problem which has been experienced in the production of oil and gas from such formations, and especially in connection with post-primary recovery operations such as water flooding, has been the collection in the borehole of refractory organic materials which clog the borehole, reduce the permeability, and inhibit the action of a water flood or other pushing medium. These refractory organic materials, such as asphaltenes and paraffins, often collect at the surface of the borehole and deposit there. One common example of their presence is the situations wherein a well has been used as a producing well and is thereafter utilized as an injection well in a waterflood operation. When producing through the well, heavy oil enters the borehole from a high pressure formation, and upon reaching the lower pressure borehole expands, depositing the heavy organic material. Upon later use of the well as an injection well in a post-primary operation, such material greatly reduces the permeability in the borehole and inhibits the flow of fluids therethrough.

The more refractory the organic materials in the borehole, the more severe is the problem. The most refractory of such materials are the asphaltenes, and thus this application often speaks in terms of this most difficult example.

If the refractory materials could be successfully dissolved, permeability could be restored and fluids could be successfully moved through the borehole. The difficulty with the art is not that solvents for dissolving such refractory materials are not known. On the contrary, when such refractory materials are isolated in the laboratory, solvents can be found which will readily dissolve the materials. The problem is that when these very solvents are passed into a well bore containing refractory organic materials such as asphaltenes, they do not satisfactorily dissolve such materials.

Applicants believe that the reason such solvents do not work satisfactorily downhole is that the solvent material are lost into the porous, water-rich sands present in or adjacent to the borehole and thus, at least frequently, by far the greater amount of the solvent injected into such a borehole is effective to dissolve the organic materials and thereby accomplish the desired effect of the injection. Consequently, vast amounts of such solvents may be injected into such wells with only minor improvements in the permeability within the borehole. Since such solvent materials are generally quite expensive, it is readily seen that great sums of money can be wasted with relatively little beneficial effect.

It would be advantageous if a process could be provided for increasing the permeability of wells wherein heavy organic materials, such as asphaltenes, have accumulated.

It would be further desirable if a composition could be provided which, upon injection into a borehole wherein refractory organic materials are present, could effectively dissolve said refractory materials to increase the permeability of the borehole.

This invention provides such a process and composition.

SUMMARY OF THE INVENTION

The compositions provided by the invention include (1) a thickening agent, (2) a carrying agent, and (3) a solvent for refractory organic materials such as asphaltenes. Desirably, the compositions also include (4) a tying agent.

As the thickening agent, applicants prefer hydroxyethylcellulose, dissolved in fresh water. As the carrying agent, applicants prefer a mixture of methanol and isopropanol. As the solvent, applicants prefer xylene. As the tying agent, applicants prefer dimethylsulfoxide.

By composition, one example of a preferred composition, is 0.7 pounds of hydroxyethylcellulose in 3.4 gallons fresh water, 12.5 gallons methanol, 12.5 gallons isopropanol, 12.5 gallons xylene, and 1.1 gallons dimethylsulfoxide.

The methods of the invention include preparation of a composition of the type indicated above, introducing said composition into a formation wherein there are refractory organic materials such as asphaltenes and porous water sands, stimulating the formation by allowing said composition to dissolve said refractory materials, and thence producing the well or beginning (or continuing) waterflood or other suitable post-primary recovery operations.

DETAILED DESCRIPTION OF PREFERRED EMBODIMENTS

In accordance with preferred embodiments of the invention, a composition is provided which is useful in effectively increasing the permeability of wells having accumulated therein refractory organic materials such as asphaltenes. Further, a process for so increasing the permeability is also provided.

In accordance with such embodiments, a composition system is provided which selectively attacks the refractory organic materials rather than short-circuiting into the porous water sands. In broad terms, such system contains (1) at least one component which thickens upon contact with the aqueous phase, (2) a component for carrying the thickening agent, and (3) a compatible solvent component which is effective to dissolve the refractory materials. The thickening agent must be one which is soluble in the non-aqueous solvent system.

In one preferred embodiment, the thickening component found to be most desirable is hydroxyethylcellulose. One example of a suitable hydroxyethylcellulose is "Natrosol 250," which is available from Hercules, Inc., Wilmington, Del. It has been found that, in the system of the invention, this material in certain concentrations is effective to substantially eliminate short-circuiting of the fluid system into the more porous water sands, and direct the fluid instead to attack the refractory organic materials. Hydroxyethylcellulose is a nonionic, water soluble ether of cellulose. A white granular powder, hydroxyethylcellulose is insoluble in most organic solvents but is soluble in hot or cold water. Consequently, this component is dissolved in water in a ratio of about one pound of hydroxyethylcellulose per five gallons of water.

Desirably, the aqueous phase should comprise from about 8%–12% of the total fluid system, on a volumetric basis. For best results, the hydroxyethylcellulose should comprise about 0.004 to about 0.016 pounds per gallon of liquid mixture.

An example of a carrying agent component suitable for carrying the thickening agent, is alcohol. Applicants prefer to use a mixture of the more readily available and inexpensive alochols, such as methanol and isopropanol. Desirably, the alcohol or other suitable carrying agent should constitute some 60%–75% of the fluid system on a volumetric basis. Applicants find it useful to use, as the carrying agent component, 50% methanol and 50% isopropanol on a volumetric basis. However, 25% methanol, 75% isopropanol, or 25% isopropanol and 75% methanol, or any intermediate concentration, would also be satisfactory.

An example of a solvent component suitable for dissolving the refractory materials is xylene, any of the isomers being satisfactory. Other suitable solvents such as toluene, or benzene, for example, could be substituted for xylene. The solvent should desirably comprise, volumetrically, some 20% to 40% of the total fluid system. Applicants believe the optimum composition of the solvent in the system is about 30%.

Applicants also prefer to include in the composition as a tying agent, a material that is a solvent for both organics and inorganics. An example of a suitable material for such purpose is dimethylsulfoxide (DMSO), a liquid which is miscible with water.

An example of a composition which is effective for the purposes described above, comprises a mixture of hydroxyethylcellulose in fresh water, dimethylsulfoxide, mixture of alcohols, and xylene. Specifically, one preferred example of such a composition is prepared by mixing 0.0167 pounds of hydroxyethylcellulose per gallon of liquid mixture prepared in accordance with the following volumetric proportions:

| | Percent |
|---|---|
| Methanol | 29.73 |
| Isopropanol | 29.73 |
| Xylene | 29.73 |
| Fresh water | 8.2 |
| Dimethylsulfoxide | 2.61 |

A composition made in accordance with the foregoing description has been used by the inventors in laboratory testing of the process as described in this application, and has been found to yield superior results by significantly increasing the permeability of test samples and making the petroleum deposits in such samples much more readily susceptible to removal from the samples either by ordinary production means, or by waterflooding or other suitable post-primary recovery means.

In accordance with the method of the invention, a composition such as mentioned above is provided. This composition is injected into the borehole of a formation which contains refractory organic materials therein and porous water sands. Upon injection into the borehole, the fluid composition becomes much more viscous when it contacts the more porous water sands, and thus preferentially seeks out the oil saturated sections of the formation. Since the composition is effective for dissolving the refractory organic material when in contact therewith, the permeability of the formation gradually begins to increase; after sufficient increase in such permeability, the well is produced, or post-primary recovery methods are instituted or resumed.

Although the examples which follow are not intended to be limiting of the invention, they do serve to illustrate applicants' contribution, and constitute the best mode of the invention as known to the applicants at the time of this application.

EXAMPLE I

Two sand-packed tubes of polyvinylchloride, 1½ inches in diameter and 18 inches long, were arranged in parallel. The permeability of the tubes had been calculated at 15.3 darcies.

Asphaltenes from a very heavy crude oil were precipitated into one of the tubes (tube #1) reducing its permeability to 1.04 darcies.

The tubes were then arranged so that the entry ports were joined and connected to a single fluid source.

225 ml. of a solvent mixture prepared by mixing 12.5 gallons commercial xylene (containing all three isomers), 12.5 gallons methanol, 12.5 gallons isopropanol, 3.4 gallons fresh water, and 1.1 gallons dimethylsulfoxide, was injected into each tube through the common entry port. 225 ml. represents approximately one-third of the pore volume of one such tube.

Water was then injected from the common fluid source into each of the tubes. The permeability of the asphaltene-plugged tube #1 was again measured, and it was found to have increased only to about 4.48 darcies.

EXAMPLE II

Example I was repeated, with the exception that 0.7 pounds of Natrosol 250, from Hercules, Inc., was added to the fluid system. Also, only 200 ml. of the fluid composition, rather than 225 ml., was injected into the tubes. The permeability of tube #1 prior to injection was measured at 15.3 darcies.

Water was then injected, flushing all fluid out of both tubes.

The permeability of the asphaltene-plugged tube #1 was measured after the test, and was found to have increased to 7.25 darcies.

From Examples I and II, applicants conclude that despite the fact that xylene (or other suitable solvent) was present in the first example which should readily have dissolved the refractory material in the asphaltene-plugged tube #1, such material was not in fact dissolved because the solvent was preferentially by-passed into the porous water-rich tube #2. Thus, the rather expensive solvent system was largely wasted.

In the second example, however, the solvent system was forced into tube #1 because of the resistance encountered by the thickening of the system in the water-rich tube #2.

The high viscosity assumed by the fluid compositions prepared in accordance with this invention will be retained until the system becomes overwhelmingly diluted with water. After that happens, the system will then flow through water-rich portions of a formation only with difficulty, but will encounter no such difficulty upon flowing through oil-rich portions. For these reasons, it is thought to be especially desirable for use in the particular context described earlier in this application.

Applicants have calculated the effect on the viscosity of the system upon the addition of large amounts of water, and such results are included in Table I which follows:

TABLE I

| Percentage water added: | Viscosity in centipoises |
|---|---|
| 2 | 2 |
| 6 | 4 |
| 10 | 11 |
| 16 | 17.3 |
| 20 | 17.3 |
| 30 | 16.7 |
| 40 | 15.4 |
| 75 | 10.2 |
| 100 | 7.4 |
| 200 | 4.6 |
| 300 | 3.2 |

Although it will be realized that the compositions and methods of the invention will perhaps be of primary utility in connection with subsequent waterflood operations, as indicated in the examples, there may be appropriate circumstances for use of the invention before or during primary recovery operations. Also, the invention may find utility as a preflush to make a formation more accessible to acid, prior to acid treatment of a well.

Although the invention has been described in terms of preferred embodiments, it will be recognized by those skilled in the art that various substitutions or additions might be made without departing from the scope of the invention as defined by the following claims. For example, other suitable solvents such as gasoline or other organic distillates might well be substituted as the solvent component of the fluid system.

What is claimed is:

1. A composition of matter useful for dissolving refractory organic materials, consisting essentially of between 0.004 and 0.016 pounds hydroxyethylcellulose, per gallon of liquid mixture, said liquid mixture including, on a volumetric basis, from about 8% to about 12% water, from about 60% to about 75% of a $C_1$–$C_3$ alkyl alcohol, and about 20% to about 32% of an organic solvent for said refractory material, said solvent being selected from the group consisting of xylene, toluene, and benzene.

2. A composition of matter in accordance with Claim 1, wherein said liquid mixture additionally includes from about 2% to about 4% of dimethyl-sulfoxide.

3. A composition of matter in accordance with claim 1, wherein said alcohol is selected from the group consisting of methanol and isopropanol, and mixtures thereof.

4. A composition of matter in accordance with Claim 1, wherein said organic solvent is xylene.

5. A composition of matter useful for dissolving refractory organic material, consisting essentially of between 0.004 and 0.016 pounds of hydroxyethylcellulose, per gallon of liquid mixture, said liquid mixture including, on a volumetric basis, from about 8% to about 12% water, from about 60% to about 75% of a $C_1$–$C_3$ alkyl alcohol for carrying said hydroxyethylcellulose, about 20% to about 32% of an organic solvent for said refractory material, said organic solvent being selected from the group consisting of xylene, toluene, and benzene, and less than about 5% dimethylsulfoxide.

6. A composition of matter in accordance with Claim 5, wherein said organic solvent is xylene.

7. A composition of matter in accordance with Claim 5, wherein said alkyl alcohol is selected from the group consisting of methanol and isopropanol, and mixtures thereof.

8. A composition of matter in accordance with Claim 7, wherein said alcohol comprises from about 25% to about 75% methanol, and from about 25% to about 75% isopropanol.

9. A composition of matter in accordance with Claim 8, wherein said alcohol comprises about 50% methanol, and about 50% isopropanol.

10. A composition of matter useful for dissolving refractory organic materials, consisting essentially of between about 0.004 and 0.016 pounds of hydroxyethylcellulose, per gallow of liquid mixture, said liquid mixture including, on a volumetric basis, about 30% of an organic solvent suitable for dissolving said refractory materials said solvent being selected from the group consisting of xylene, toluene and benzene, about 60% of a $C_1$–$C_3$ alkyl alcohol, and less than about 10% fresh water.

11. A composition of matter in accordance with Claim 10, which further includes about 2% to about 3% dimethylsulfoxide.

12. A composition of matter in accordance with Claim 11, wherein said alcohol is a mixture of isopropanol and methanol, and said organic solvent is xylene.

References Cited

UNITED STATES PATENTS

| 2,356,205 | 8/1944 | Blair et al. | 252—8.55 |
| 2,356,254 | 8/1944 | Lehmann et al. | 252—8.55 |
| 2,358,665 | 9/1944 | Shapiro | 252—8.55 |
| 3,292,696 | 12/1966 | Sandiford | 252—8.55 X |
| 3,402,770 | 9/1968 | Messenger | 252—8.55 X |
| 2,341,500 | 2/1944 | Detling | 252—8.55 X |
| 3,696,035 | 10/1972 | Ninmerick | 252—8.55 |
| 3,634,237 | 1/1972 | Crenshaw et al. | 252—8.55 |

HERBERT B. GUYNN, Primary Examiner

U.S. Cl. X.R.

166—274, 275, 304; 252—364